(No Model.)

G. CROMPTON & H. WYMAN.
Shuttle Box Mechanism for Looms.

No. 231,153. Patented Aug. 17, 1880.

Witnesses.
Arthur Reynolds.
Laurence F. Connor.

Inventors
George Crompton & Horace Wyman.
by Crosby & Gregory Attys.

N. PETERS, PHOTO-LITHOGRAPHER, WASHINGTON, D.C.

UNITED STATES PATENT OFFICE.

GEORGE CROMPTON AND HORACE WYMAN, OF WORCESTER, MASSACHUSETTS, ASSIGNORS TO SAID CROMPTON.

SHUTTLE-BOX MECHANISM FOR LOOMS.

SPECIFICATION forming part of Letters Patent No. 231,153, dated August 17, 1880.

Application filed June 9, 1880. (No model.)

*To all whom it may concern:*

Be it known that we, GEORGE CROMPTON and HORACE WYMAN, of Worcester, county of Worcester, State of Massachusetts, have invented an Improvement in Shuttle-Box Mechanism for Looms, of which the following description, in connection with the accompanying drawings, is a specification.

This invention relates to mechanism for operating shuttle-boxes for looms, and has especial reference to means for moving the shifting-lever that carries the toothed crank into and out of engagement, the said devices being adapted to move the shifting-lever positively in both of its directions of movement, so as to positively hold the said toothed crank in engagement with that one of the toothed long gears that turns the crank in one or the other direction.

In an application filed for United States patent by us November 21, 1879, to which reference may be had, we have shown and described a series of shifting-levers having toothed cranks joined by connecting-rods with the shuttle-box levers.

In this present invention we have bifurcated the upper ends of these shifting-levers and arranged between the said bifurcated parts an eccentric having a gear connected with it, and which is rotated in one and then in the other direction by (as herein shown) a vibrating sector or lever, which is moved at the proper times in accordance with the requirements of the pattern surface or chain for the shuttle-boxes.

We do not limit our invention to the employment of the particular shuttle-box levers herein shown and the manner of their connection with the tier of shuttle-boxes, as they may be as indicated in any of the inventions of either of us already filed in the United States Patent Office.

Figure 1:
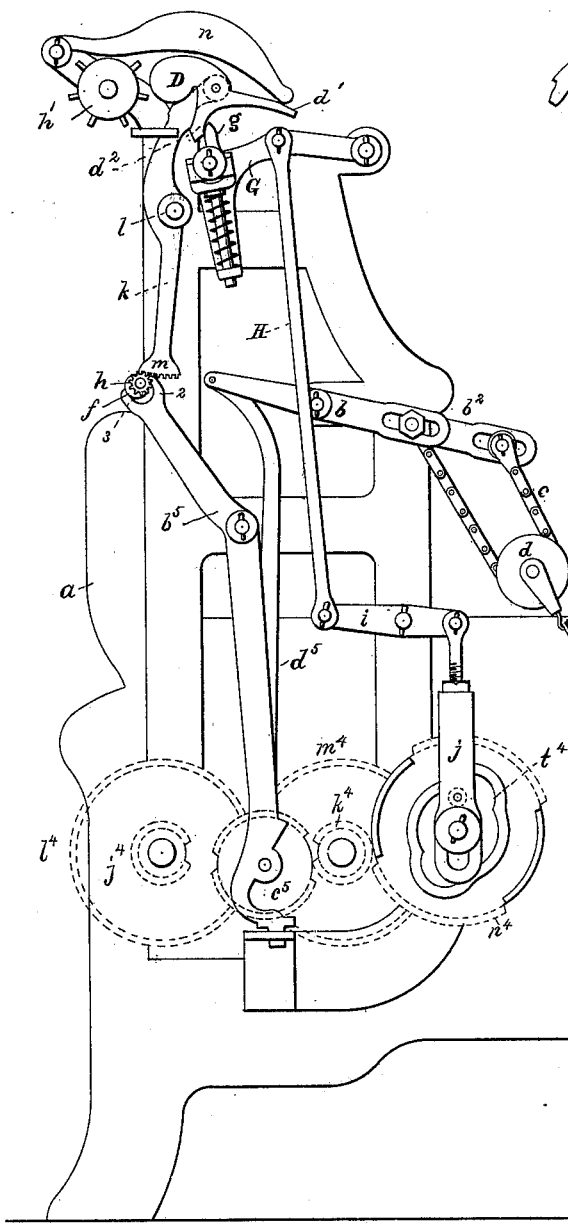
Figure 2:
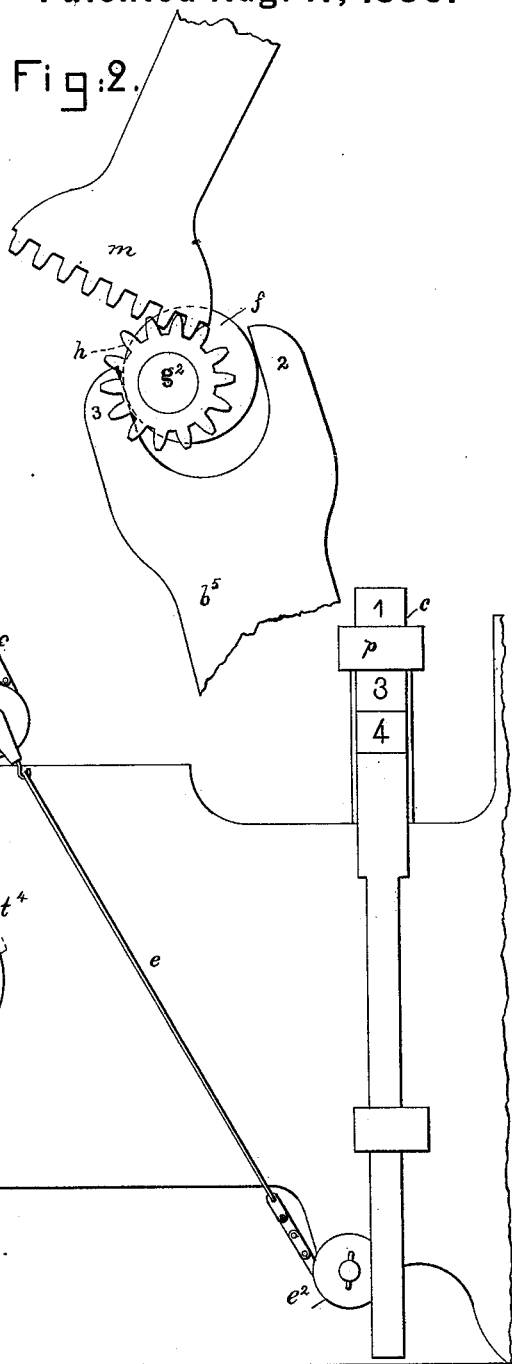

Figure 1 of the drawings represents, in side elevation, sufficient of a loom to show our invention applied, and Fig. 2 is a detail on an enlarged scale.

The loom-frame $a$, lay $p$, and tier of shuttle-boxes $c$ are and will be of any usual construction. The toothed crank $c^5$, long gears $j^4$ $k^4$, toothed gear $n^4$, and means to operate it to rotate the said long gears are all as common in the application referred to. So, also, the toothed cranks $c^5$ and long gears are substantially as in United States Patent No. 209,714, November 5, 1878; and instead of the devices herein shown for operating the long gears and toothed cranks we might employ the devices of the said patent for that purpose.

The cam $t^4$ operates the lever $i$ by the link $j$, and the lever $i$ is joined to the link H, connected with the lever G, having the wedge-shaped toes or plungers $g$, that operate upon one or the other side of wedge-shaped ends or portions $d^2$ of the selectors D, weighted at one end, and pivoted upon the short sector-levers $k$, pivoted at $l$, and having teeth, as at $m$.

The ends $d'$ of the selectors are operated upon by the weighted fingers $n$ when the latter are not held up by the pins or other usual projections or indicating-surfaces of the usual pattern surface or chain, and when the said fingers are lifted by the pattern surface or chain, then the weighted ends of the selectors predominate. In this way the plungers $g$, moved upward once for each step of the pattern-surface and each beat of the lay, is made to strike against one or the other of the inclined faces of the parts $d^2$ of the selectors and turn the sector-levers in one or the other direction about their axes, causing the said sectors to engage the pinions $h$ on the stud $g^2$, the said pinions each having connected with them at one side an eccentric, $f$, placed between the bifurcated ends 2 3 of the shifting-levers to be moved by the said eccentrics. In this way it will be seen that the shifting-levers are moved positively in both directions, causing the positive engagement of the toothed cranks with the long gears $j^4$ or $k^4$, according to the direction of movement of the said shifting-levers, and holding the same positively in engagement with the said long gear.

We are aware that an eccentric has been employed to move a shuttle-box lever, and therefore lay no claim to such a contrivance. The shuttle-box levers $b$ $b^2$, their connected chain $c$, running sheave $d$, flexible chain, and guide-pulley $e^2$ are as described in an application for United States Patent made by Geo.

Crompton, and filed December 2, 1879, to which reference may be had, the said two levers, by their changes of position, controlling a tier of four shuttle-boxes.

The plunger $g$, during the movements of the mechanism in changing the position of the shuttle-box levers and boxes, always act against one or the other edge of the wedge-shaped ends $d^2$ of the selectors, and positively hold each toothed crank in engagement with one or the other of the long gears $j^4$ or $k^4$, so that there can be no slippage between the said cranks and long gears.

The bifurcated ends 2 3 of the shifting-lever, instead of being formed solid on the shifting-levers, may be made of flat springs attached by a bolt thereto, and adapted to give way if any undue pressure comes upon the lever.

We claim—

The combination, in a shuttle-box-operating mechanism, of the following instrumentalities, viz: a series of shifting-levers having bifurcated ends and toothed cranks $c^5$ thereon, long gears $j^4$ $k^4$, and means to rotate them, a series of connecting-rods between the toothed cranks and shuttle-box levers, a tier of shuttle-boxes, shuttle-box levers, and connections between the said levers and tier of shuttle-boxes, a series of eccentrics embraced by the bifurcated ends of the shifting-levers and connected gearing, a series of levers, $k$, to actuate the said eccentrics, a series of selectors, pattern mechanism, and means, substantially as described, to actuate the said selectors and levers $k$ according to the requirements of the pattern-surface, the combination being and operating substantially as described.

In testimony whereof we have signed our names to this specification in the presence of two subscribing witnesses.

GEO. CROMPTON.
HORACE WYMAN.

Witnesses:
J. B. SYME,
J. A. WARE.